(12) United States Patent
Schabosky et al.

(10) Patent No.: US 8,191,259 B2
(45) Date of Patent: Jun. 5, 2012

(54) METHOD FOR SETTING UP A CONDENSATION FACILITY USING A PRE-ASSEMBLY FRAME AND A WELDED ROOT AND FINISH SEAM

(75) Inventors: Heinz-Dieter Schabosky, Recklinghausen (DE); Markus Schmidt, Herten (DE)

(73) Assignee: GEA Energietechnik GmbH, Bochum (DE)

( * ) Notice: Subject to any disclaimer, the term of this patent is extended or adjusted under 35 U.S.C. 154(b) by 535 days.

(21) Appl. No.: 12/299,682

(22) PCT Filed: Mar. 20, 2007

(86) PCT No.: PCT/DE2007/000500
§ 371 (c)(1),
(2), (4) Date: Nov. 5, 2008

(87) PCT Pub. No.: WO2008/000202
PCT Pub. Date: Jan. 3, 2008

(65) Prior Publication Data
US 2009/0178279 A1    Jul. 16, 2009

(30) Foreign Application Priority Data
Jun. 27, 2006   (DE) .......................... 10 2006 029 773

(51) Int. Cl.
*B23K 11/10* (2006.01)
*B23K 33/00* (2006.01)

(52) U.S. Cl. ..................... 29/890.07; 165/299; 219/105; 219/106; 219/137 R

(58) Field of Classification Search ............. 29/890.053, 29/890.054, 890.07, 525.14; 228/164–174, 228/44.5, 49.3, 183, 142, 151, 249, 250, 228/49.4, 49.1, 137; 165/39, 299; 219/612, 219/33 C, 55, 57, 77, 67, 78.01, 101, 104, 219/105; *B23K 11/00, 33/00, 9/25, 9/02, B23K 11/02, 11/10*
See application file for complete search history.

(56) References Cited

U.S. PATENT DOCUMENTS
1,165,048 A * 12/1915 White ........................... 403/219
(Continued)

FOREIGN PATENT DOCUMENTS
DE              11 26 430 B       3/1962
(Continued)

OTHER PUBLICATIONS
ASM International Handbook Committee (1993). ASM Handbook, vol. 6—Welding, Brazing, and Soldering . . . ASM International, p. 861. Online version available at: http://www.knovel.com/web/portal/browse/display?_EXT_KNOVEL_DISPLAY_bookid=3110&VerticalID=0.*

*Primary Examiner* — David Bryant
*Assistant Examiner* — Jason L Vaughan
(74) *Attorney, Agent, or Firm* — Henry M. Feiereisen; Ursula B. Day

(57) ABSTRACT

Method for setting up a condensation plant, for which two tube bundles (2, 3) are placed on a roof-shaped preassembly frame (1) and connected to one another in a first area. The tube bundles (2, 3,), along with the base plates (5, 6) thereof which hold the heat-exchanger tubes, are placed in supports (10) at a roof ridge strut (11) of the preassembly frame (1) in such a way that the mutually facing longitudinal sides (12, 13) of the base plates (5, 6) can be welded together by means of a root seam, before the preassembled roof-shaped tube bundle delta (14) is lifted from the preassembly frame (1) and brought into the installed position.

3 Claims, 3 Drawing Sheets

U.S. PATENT DOCUMENTS

| | | | | | |
|---|---|---|---|---|---|
| 1,959,791 | A | * | 5/1934 | Kautz | 228/226 |
| 2,249,723 | A | * | 7/1941 | Orr, Jr. | 228/164 |
| 2,427,021 | A | * | 9/1947 | Rapp | 52/222 |
| 2,469,965 | A | * | 5/1949 | Holt | 29/271 |
| 2,541,784 | A | * | 2/1951 | Shannon | 52/92.2 |
| 2,652,473 | A | * | 9/1953 | Gordon et al. | 219/106 |
| 2,717,664 | A | * | 9/1955 | Grafman | 52/396.04 |
| 3,039,570 | A | * | 6/1962 | Miller | 52/750 |
| 3,182,988 | A | * | 5/1965 | Woodall | 269/37 |
| 3,351,734 | A | * | 11/1967 | Masayasu et al. | 219/137 R |
| 3,384,165 | A | * | 5/1968 | Mathews | 165/122 |
| 3,482,073 | A | * | 12/1969 | Roberts | 219/61.2 |
| 3,495,110 | A | * | 2/1970 | Meinardi | 219/101 |
| 3,556,508 | A | * | 1/1971 | Varga | 269/155 |
| 3,588,426 | A | * | 6/1971 | Harriau et al. | 219/67 |
| 3,613,106 | A | * | 10/1971 | Cavagnero | 219/105 |
| 3,613,107 | A | * | 10/1971 | Cavagnero | 219/105 |
| 3,639,724 | A | * | 2/1972 | Gerath | 219/137 R |
| 3,688,080 | A | * | 8/1972 | Cartwright et al. | 219/137 R |
| 3,716,097 | A | * | 2/1973 | Kelp et al. | 165/299 |
| 3,732,393 | A | * | 5/1973 | Wilkens et al. | 219/137 R |
| 3,800,861 | A | | 4/1974 | Flitner et al. | |
| 4,186,864 | A | * | 2/1980 | Ishimaru et al. | 228/226 |
| 4,348,131 | A | * | 9/1982 | Shimanuki et al. | 403/272 |
| 4,450,899 | A | * | 5/1984 | Jakobsson et al. | 165/279 |
| 4,616,453 | A | * | 10/1986 | Sheppard et al. | 52/93.1 |
| 5,159,974 | A | * | 11/1992 | Victory, Jr. | 165/96 |
| 5,279,360 | A | * | 1/1994 | Hughes et al. | 165/111 |
| 5,526,628 | A | * | 6/1996 | Knudson | 52/528 |
| 5,533,259 | A | * | 7/1996 | Hughes et al. | 29/890.043 |
| 5,952,109 | A | * | 9/1999 | Nagami et al. | 428/599 |
| 6,474,272 | B2 | * | 11/2002 | Bensing et al. | 122/459 |
| 6,519,900 | B1 | * | 2/2003 | Pierce | 52/66 |
| 6,983,525 | B2 | * | 1/2006 | Moreno | 29/464 |
| 7,493,730 | B2 | * | 2/2009 | Fennell, Jr. | 52/199 |
| 7,516,580 | B2 | * | 4/2009 | Fennell, Jr. | 52/199 |

FOREIGN PATENT DOCUMENTS

| | | | |
|---|---|---|---|
| DE | 19 62 061 | A1 | 2/1972 |
| DE | 34 14 589 | A1 | 12/1984 |
| DE | 3507010 | A1 * | 8/1986 |
| DE | 199 37 800 | A1 | 2/2001 |
| JP | 62110872 | A * | 5/1987 |

* cited by examiner

Prior Art

METHOD FOR SETTING UP A CONDENSATION FACILITY USING A PRE-ASSEMBLY FRAME AND A WELDED ROOT AND FINISH SEAM

BACKGROUND OF THE INVENTION

The invention relates to a method for setting up a condensation facility.

The individual pipe bundles of an air condenser set up as an A-frame are typically preassembled on a roof-shaped preassembly frame. The preassembly frame has exactly the slope which the individual pipe bundles are supposed to have in the installation position. To this end, the pipe bundles to be connected with one another are lifted by a crane onto the preassembly frame, so that they are located opposite each another in the roof ridge region. Until now, threaded bores were provided in the base plates at the end of the pipe bundles, so that preassembly angles could be attached between the two pipe bundles with screws. The connected pipe bundles were then transported to the installation position. However, these preassembly angles could not be removed in the installation position, but were covered by an angle iron which extends in the longitudinal direction of the steam distribution line to be welded later on the roof ridge side. The corner region of the angle iron is faces up. Its legs are welded to the base plates of the pipe bundles along both longitudinal sides by a fillet weld.

The problem is here that the pipe bundles must already be screwed together with great accuracy because the longitudinal edges of the angle irons would otherwise not precisely contact the base plates, which makes welding difficult or even impossible. The conventional approach therefore occasionally required time-consuming finish work. An attempt was then made to use larger angle irons to prevent collisions with the preassembly angles and delays in the installation. However, the larger angle irons significantly increase material costs.

Moreover, weight is added in the region of the base plates, because the base plates must have an adequate width so that the pipe bundles and the preassembly angles can be screwed together. The base plates must also have threaded bores, the fabrication of which is expensive. The costs for material and labor are relatively high, in particular because the preassembly angles, through which the threaded bolts must be inserted, are produced individually.

It must also be taken into consideration that a continuous angle is required in the region of a pipe bundle connected in form of a dephlegmator, which due to its structure is heavier than the angle in the region of pipe bundles connected in form of a condenser. The steam distribution line is not connected to the individual base plates of the pipe bundle in the region connected in form of a dephlegmator. Instead, individual suction chambers are mounted on each individual base plate of a pipe bundle. Pipe fittings are connected to the individual suction chambers, through which air is suctioned in. A central angle in this region must prevent the air suctioned in from below or cooling air flowing from below from flowing in between the opposing pipe bundles in the roof ridge region, which would cause a significant pressure drop. An angle iron must therefore also be placed in this region which, however, is not intended to prevent steam from exiting, but rather to guide the cooling airflow through the pipe bundle and prevent leaks in the roof ridge region Another disadvantage is that the preassembly angles and angle irons used until now need to be painted after installation to prevent corrosion; however, the interior space underneath the angles is difficult to access. Although this region is not subject to corrosion due to precipitation, because it is continuously exposed to cooling air and therefore unable to collect rainwater, the angle iron can be damaged by humidity, in particular in condensation facilities installed in power plants in tropical climates.

SUMMARY OF THE INVENTION

It is therefore an object of the invention to improve the preassembly of the pipe bundles which are to be connected to form a pipe bundled delta, in particular, concerning material costs and time requirements.

The object is attained by a method for setting up a condensation facility, wherein two pipes bundles are placed on a roof-shaped preassembly frame and connected with one another in the roof ridge region, wherein the pipe bundles are placed with their base plates, which support the heat exchanger pipes, in supports on a roof ridge strut of the preassembly frame, so that the opposing longitudinal sides of the base plates are welded together with a root seam, before the roof-shaped pipe bundle delta, which is preassembled in this manner, is lifted from the preassembly frame and moved into the installation position.

The pipe bundles are placed with their base plates, which support the heat exchanger pipes, in supports on a roof ridge strut of the preassembly frame, so that the opposing longitudinal sides of the base plates are welded together with a root seam, before the roof-shaped pipe bundle delta, which is preassembled in this manner, is lifted from the preassembly frame and moved into the installation position. Finish welding is performed in the installation position.

A weld connection with a root weld seam has significant advantages which have not been recognized in the past. In particular, the preassembly angles required until now can be eliminated entirely by welding with a root seam. This also eliminates the threaded bores in the base plates, which reduces the costs for both the fabrication and the material.

Material is also saved in that the previously required areas of the base plates for screw connections can be made narrower, because a support surface for the angles is no longer required. As a result, the pipe bundles in the roof ridge region move closer together. The width is reduced by about 110 mm, allowing a reduction in the size of the entire steel substructure of the steel structure that supports the pipe bundles, because the entire condensation facility requires less roof area.

It is also important that the angle iron, which was required until now as a cover, is completely eliminated. The weld seams required along both sides of the angle iron also need no longer be produced. An adequate seal against steam can be attained by welding the base plates directly, with finish welding for making the base plates impervious to steam performed only in the installation position. The root weld seam is only used to attach the two pipe bundles to each other, which must be exactly aligned, so that they can be lifted as a preassembled pipe bundle delta onto the support frame. Using a suitable support frame for the pipe bundle delta prevents spreading of the pipe bundled delta which is not connected in the base region. The root weld seam can also safely support the stress during transport, because the lower ends of the pipe bundled delta move only in a range of several millimeters during proper transport. This change in angle of the pipe bundled delta does not adversely affect the connection by the root seam.

It is provided that the root seam is welded only in those regions where no supports are placed. This has practical reasons, because the supports should not be damaged by the welding operation. On the other hand, it is not necessary to place the root seam across the entire width of a pipe bundle, because shorter weld seam sections already provide sufficient mechanical strength. Advantageously, the root seam may already be made as long as possible during the preassembly on the preassembly frame, so that most of the preparation for the at least one finish seam is already completed.

According to an advantageous embodiment, the upper longitudinal edges of the opposing longitudinal sides of the base plates, which form an angle with one another, are beveled twice, producing an upper bevel with a greater bevel angle and a lower bevel with a smaller bevel angle, wherein the smaller bevel angle is selected so that the lower bevels of the base plates are aligned parallel to each other. The weld seams are prepared in this manner so that, for example, base plates enclosing an angle of 30° can be welded across the entire thickness of the metal plate. This can be attained by providing the longitudinal edges with a relatively large bevel angle, allowing a welding electrode to be inserted between the two base plates to the greatest possible depth. The aperture angle of the V-seam between the two base plates may therefore preferably be 60°, i.e., an upper bevel angle of 30° at each longitudinal edge is advantageous, because the base plates themselves are each inclined by 30° with respect to the horizontal.

If a lower bevel angle of 30° is selected with this configuration, then the lower bevels are parallel to each other in the installation position and abut each other by forming a planar surface. This has advantages for the mutual alignment of the pipe bundles and simplifies the welding process.

The method of the invention exhibits its advantages both with pipe bundles connected in form of a dephlegmator as well as with pipe bundles connected in form of a condenser. In each case, the relatively heavy angle irons are eliminated. The invention also simplifies significantly the later application of corrosion protection paint onto the welded base plates, because undercut cavities are no longer formed.

The preassembly of the pipe bundles according to the invention is also much less time-consuming than the previously used approach. Calculations have shown that with the changed preassembly process 12 to 14 pipe bundle deltas can be set up each day, instead of only 10 pipe bundle deltas when using the conventional method. The time required for setting up the pipe bundle deltas is important, because setup of the pipe bundle deltas requires a crane. The expenses for cranes are typically very high.

In the installation position, at least one finish seam is welded on top of the root seam. However, a crane is no longer required in this phase, resulting in cost savings. A central weld seam between the base plates of the pipe bundles can be produced much more cost-effectively than parallel fillet seams, which were until now required for welding angle irons between the base plates.

BRIEF DESCRIPTION OF THE DRAWING

The invention will now be described with reference to the exemplary embodiment depicted in the drawings.

DETAILED DESCRIPTION OF PREFERRED EMBODIMENTS

Figure 1:
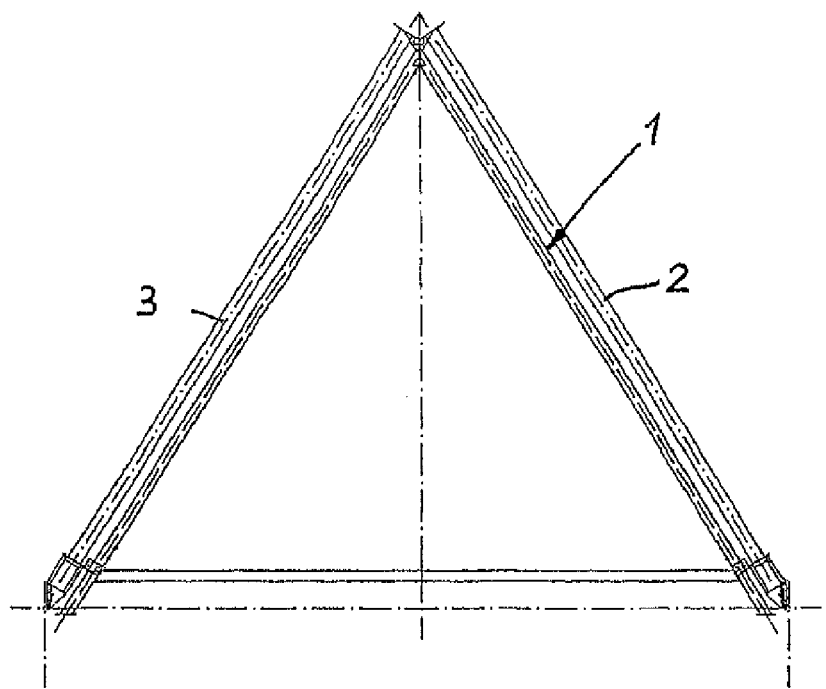
FIG. 1 shows in a side view a roof-shaped preassembly frame with the pipe bundles.
Figure 2:
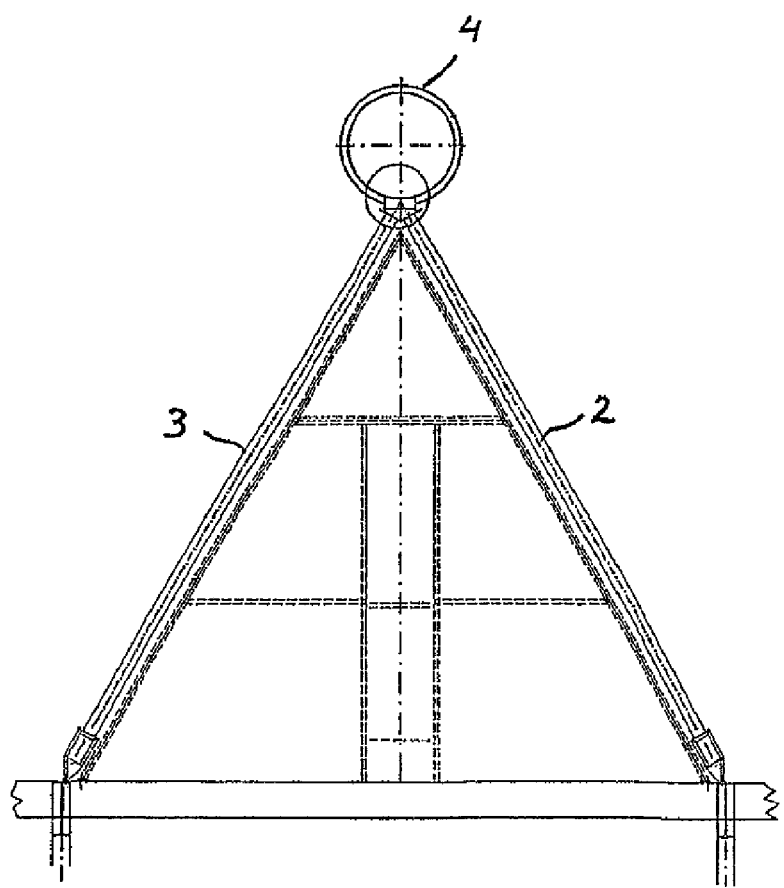
FIG. 2 shows a heat exchanger delta in the installation position.

FIG. 1 shows in a cross-sectional view a roof-shaped preassembly frame 1 on which two pipe bundles 2, 3 are placed for connection to one another in their roof ridge region. After the two pipe bundles 2, 3 are connected to form a heat exchanger delta, they are lifted by a crane from the preassembly frame 1 and moved to the installation position, as shown in FIG. 2. In the installation position, the preassembled heat exchanger delta is welded to the steam distribution line 4 on roof ridge.

Figure 5:
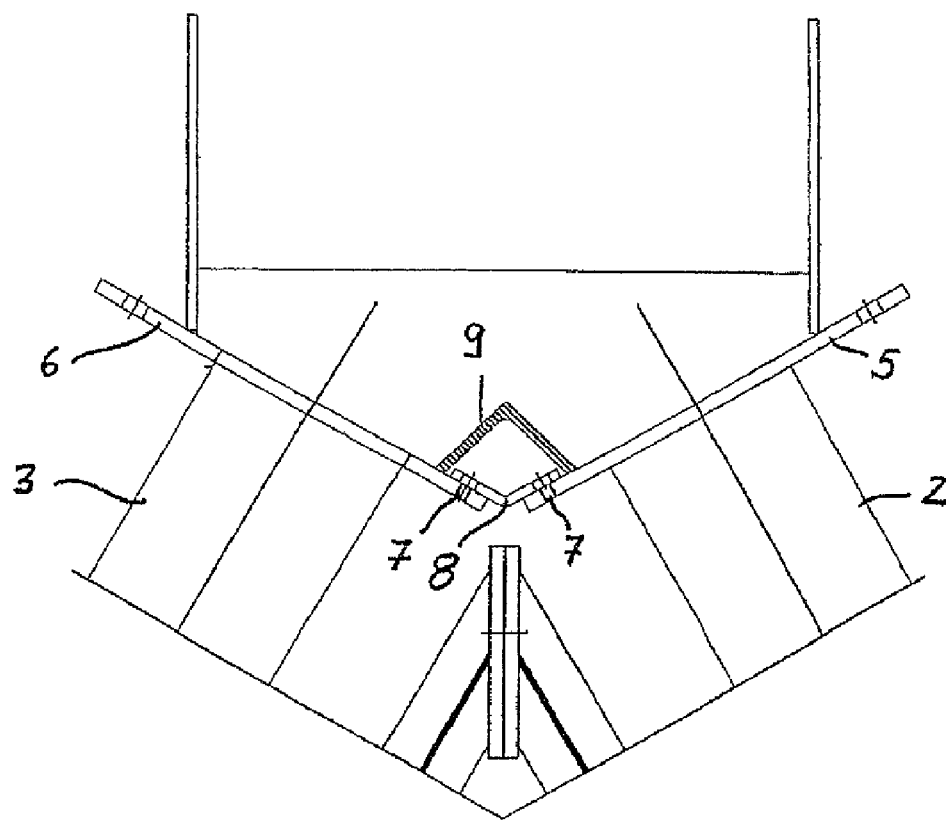
FIG. 5 shows a cross-sectional view through the roof ridge region of a conventional heat exchanger delta.

FIG. 5 illustrates a conventional assembly process for the pipe bundles 2, 3. Threaded bores 7 which are aligned with the through bores of a preassembly angle 8 are located on the opposing longitudinal edges in the angled base plates 5, 6 of the pipe bundles 2, 3. The two base plates 5, 6 can be screwed together with a preassembly angle 8. It will be understood that several preassembly angles 8 are required for each heat exchanger delta. After the preassembled heat exchanger delta is screwed together with the preassembly angles 8, it is moved into the installation position, where the illustrated angle iron 9 is placed over the preassembly angle 8 and welded by V-weld seams to the base plates 5, 6.

Figure 3:
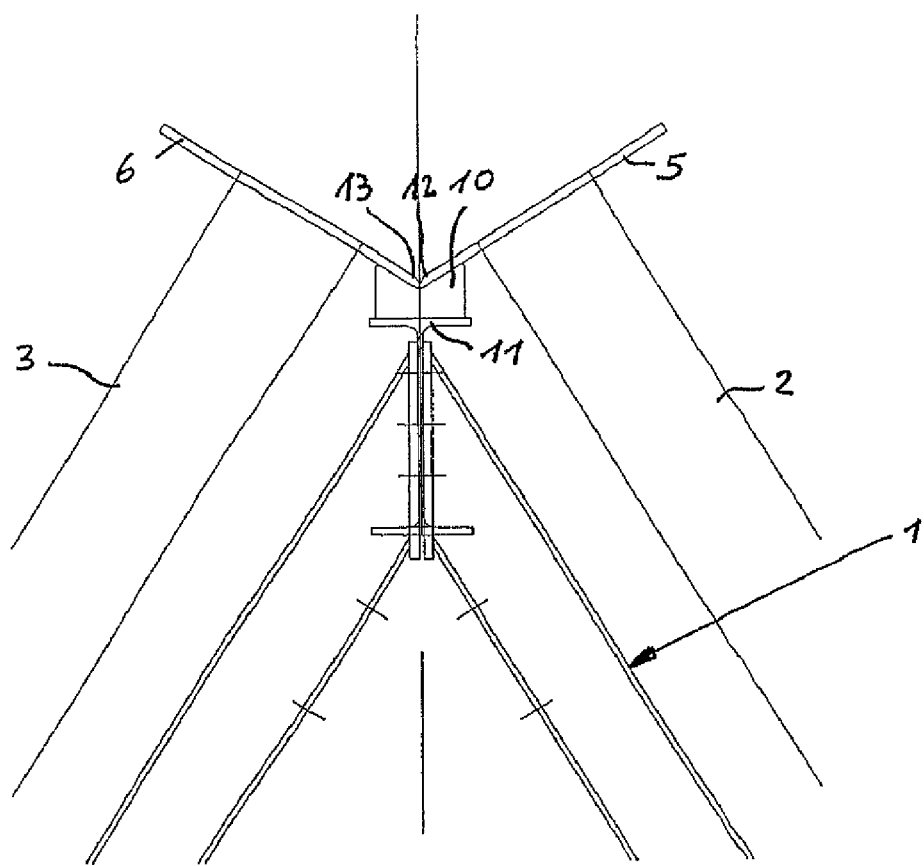
FIG. 3 shows in a side view the roof ridge region of the preassembly frame of FIG. 1.

According to the method of the invention, the preassembly angles 8 and the angle irons 9 can be eliminated entirely. Instead, the base plates 5, 6 of the pipe bundles 2, 3 are placed on spaced-apart supports 10 (see FIG. 3) which are affixed to a roof ridge strut 11 of the preassembly frame 1. The top sides of the supports 10 have surfaces for the base plates 5, 6. The support surfaces form a V-shaped groove, so that the base plates 5, 6 contact each other with their opposing longitudinal sides 12, 13 in the groove ground, where they can be welded together by a root seam. The root seam is not shown in detail and is not welded in the region of the supports 10, but rather only between the supports so that the supports 10 are not damaged. The completed root seam is welded in the installation position, as are the finish layers covering the root seam. Additional welding is required in any event in the installation position, for example for connecting adjacent heat exchanger deltas with one another.

Figure 4:
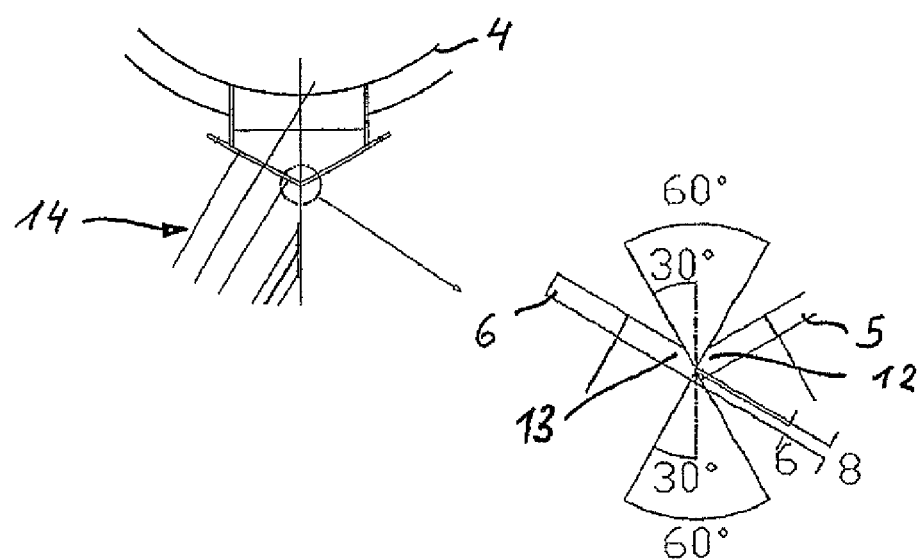
FIG. 4 shows the longitudinal sides of the base plates of the pipe bundles in an enlarged view.

FIG. 4 shows on an enlarged scale the roof ridge region of a heat exchanger delta 14 set up according to the invention, already with a welded steam distribution line 4, and also on an enlarged scale the region of the opposing longitudinal sides 12, 13 of the base plates 5, 6. In this exemplary embodiment, the base plates 5, 6 are each inclined by 30° relative to the horizontal. Consequently, the end faces enclose an angle of 60°, as shown at the bottom of FIG. 4. To prevent the longitudinal sites 12, 13 from contacting each other along a line, the base plates 5, 6 are beveled on two sides. The upper bevels are dimensioned so as to create in the installation position an angle of 30° with respect to the vertical and an aperture angle of 60° between the two base plates 5, 6. A center bevel is arranged following the upper bevel, with the bevel angle of the center bevel corresponding to the slope of the base plates 5, 6 with respect to the horizontal, i.e., in this exemplary embodiment 30°. As a result, the base plates 5, 6 make two-dimensional contact over a 2 mm wide area. This two-dimensional contact area is melted by the initially welded root seam, thereby producing a fixed connection between the two base plates 5, 6 and hence also between the pipe bundles 2, 3. The aforementioned finish weld seams are welded on top of the root seam in the installation position.

What is claimed is:

1. A method for setting up a condensation facility, comprising the steps of:
    placing two base plates, each base plate carrying corresponding pipe bundles supporting heat exchanger pipes, in a plurality of supports disposed on a strut located on a roof ridge of a roof-shaped preassembly frame, said supports having support surfaces forming a V-shaped groove, with the base plates contacting the support surfaces without being mechanically attached to the support surfaces;
    welding opposing longitudinal sides of the base plates together with a root seam in areas located between the supports to form a roof-shaped pipe bundle delta;
    connecting the two pipe bundles with one another in a region of the roof ridge;
    lifting the pipe bundle delta from the preassembly frame;
    moving the preassembled pipe bundle delta into without the preassembly frame into an installation position of the condensation facility; and
    welding a finish seam over the root seam only when the pipe bundle delta is in the installation position.

2. The method of claim 1, wherein the root seam is welded only in regions away from the supports.

3. The method of claim 1, wherein the base plates enclose an angle and upper longitudinal edges of the opposing longitudinal sides of the base plates are beveled on two sides, with an upper bevel having a greater bevel angle and a lower bevel having a smaller bevel angle, and wherein the smaller bevel angle is selected so that the lower bevels of the base plates are aligned parallel to one another.

* * * * *

UNITED STATES PATENT AND TRADEMARK OFFICE
CERTIFICATE OF CORRECTION

PATENT NO.       : 8,191,259 B2                     Page 1 of 1
APPLICATION NO.  : 12/299682
DATED            : June 5, 2012
INVENTOR(S)      : Heinz-Dieter Schabosky et al.

It is certified that error appears in the above-identified patent and that said Letters Patent is hereby corrected as shown below:

Column 6, Claim 1, line 2: After delta remove "into"

Signed and Sealed this
Seventh Day of August, 2012

David J. Kappos
*Director of the United States Patent and Trademark Office*